No. 878,611. PATENTED FEB. 11, 1908.
E. B. CRIBB.
TRANSMISSION GEARING.
APPLICATION FILED MAY 28, 1907.
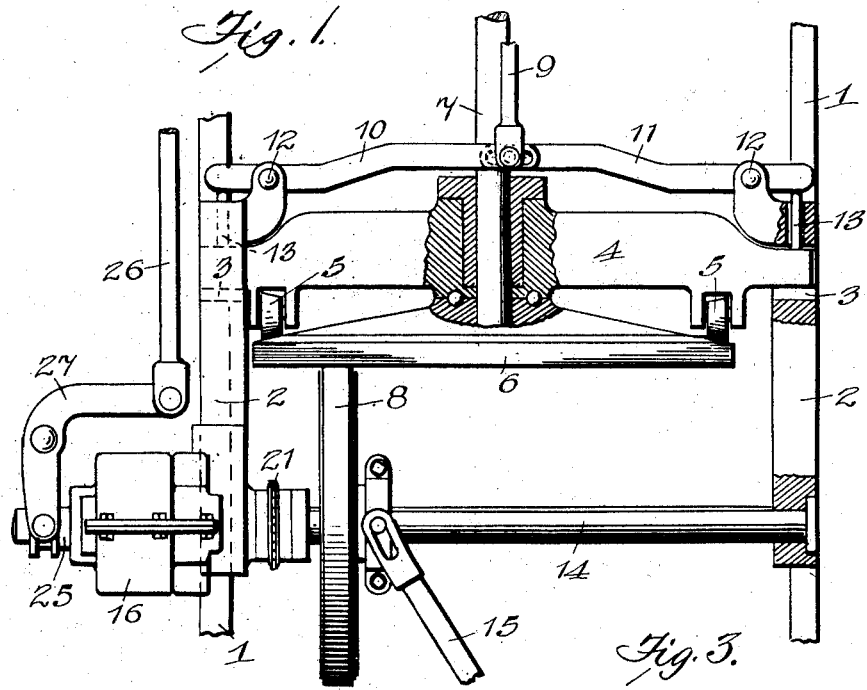
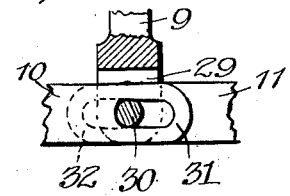
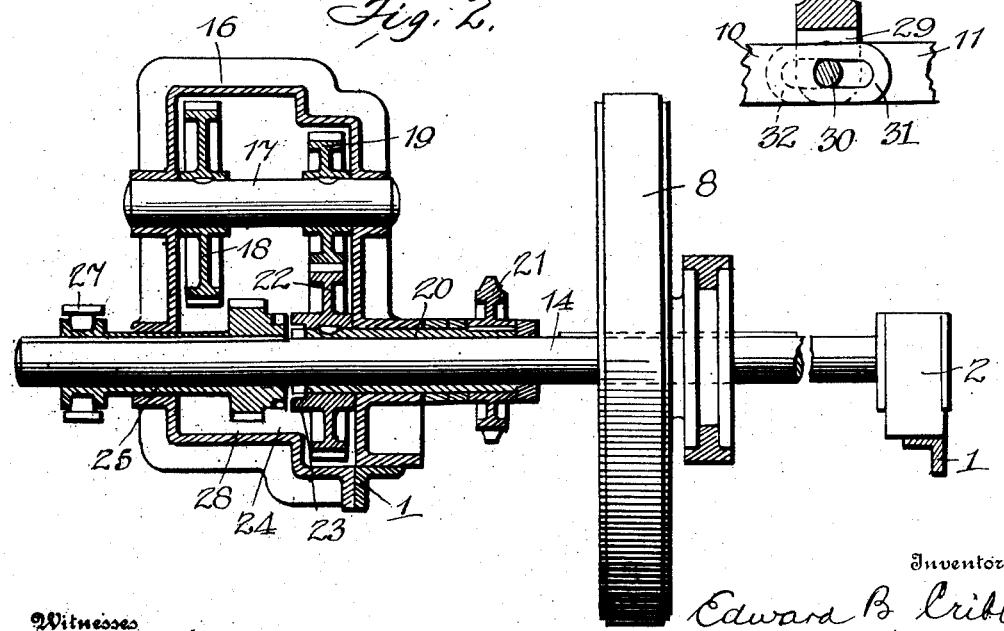
Witnesses
Chas. K. Davis.
Myron T. Clear
Inventor
Edward B. Cribb,
By
C. L. Parker
Attorney

UNITED STATES PATENT OFFICE.

EDWARD B. CRIBB, OF SHAWNEE, OKLAHOMA.

TRANSMISSION-GEARING.

No. 878,611.  Specification of Letters Patent.  Patented Feb. 11, 1908.

Application filed May 28, 1907. Serial No. 376,181.

*To all whom it may concern:*

Be it known that I, EDWARD B. CRIBB, a citizen of the United States, residing at Shawnee, in the county of Pottawatomie, Oklahoma, have invented certain new and useful Improvements in Transmission-Gearing, of which the following is a specification.

My invention relates to a new and useful transmission gearing for automobiles, and particularly contemplates the provision of a simple and inexpensive frictional gearing which may be quickly and easily operated to change speeds, and which, in its general construction provides an improvement from similar forms of gearing now in use.

My invention further resides in the features of construction, arrangement and combination as will be hereinafter described with reference to the accompanying drawings, in which, Figure 1 is a plan view of the mechanism comprising my invention, certain parts being shown in section. Fig. 2 is a vertical sectional view through the gear case showing the friction wheel and its shaft in elevation, and Fig. 3 is a part sectional plan view of parts to be hereinafter specifically referred to.

In the practical embodiment of my invention I employ the parallel side frames 1 on which are mounted the boxes 2. Transversely disposed between said frames 1 and having its ends slidably mounted in openings 3 in said boxes 2 is a friction disk controlling arm 4, provided with rollers 5, engaging against the friction disk 6, mounted upon the end of the engine shaft 7, mounted through the arm 4. The rollers 5 are operated to bear against said friction disk 6 to force the same into frictional engagement with the friction wheel 8 by means of a reach rod 9, designed to operate levers 10 and 11, pivotally mounted in bearings 12 adjacent the boxes 2, and bearing at their ends upon adjusting pins 13, arranged through openings in said boxes 2, and bearing upon the ends of the controlling arm 4.

The friction wheel 8 is keyed upon the friction wheel shaft 14 to slide thereon under actuation of the shifting lever 15, across the face of the friction disk 6. The friction wheel shaft 14 is mounted through the two-part gear casing 16, arranged upon one of the side frames 1, and provided with a short rotatable shaft 17 arranged therein parallel to the shaft 14, and provided with large and small gears 18 and 19 keyed thereon. A sleeve 20 is loosely mounted on said shaft 14, and is provided with a sprocket wheel 21, connected by a suitable sprocket chain to the driven shaft of the automobile, and with a gear wheel 22 keyed thereon within the gear case 16, and arranged to mesh with the gear wheel 19 keyed on the short shaft 17. The gear 22 is further provided with a clutch face 23, adapted to be clutched with the face 24 of the sleeve 25, keyed on the friction wheel shaft 14 to slide thereon under actuation of the reach rod 26, and the bell crank lever 27, and provided with a gear wheel 28, adapted to be meshed with the gear 18, keyed on the short shaft 17.

The operating reach rod 9, previously referred to, is provided with a bifurcated end 29, provided with a pin 30, arranged through and working in the slotted ends 31 and 32 of the levers 10 and 11, respectively, in order that the upward movement of said rod 9 will move the said levers to force the pins 13 against the arm 4, in turn sliding said arm within the transverse slots 3 in the boxes 2, and forcing its rollers 5 against the friction disk 6 for the purpose previously mentioned.

The operation of the change speed mechanism is as follows, it being understood that the friction wheel 8 may be readily actuated over the face of the disk 6 by means of the shifting lever 15 and its connections: For a high speed, the reach rod 26 is operated to move the sleeve 25 to clutch the faces 23 and 24, thereby transmitting the power from shaft 14 through sleeve 25 to the sleeve 20 and sprocket wheel 21. When, however, a low speed is desired, said reach rod is operated to reverse the previous movement of the sleeve 25, meshing gears 28 and 18, and thereby transmitting power from shaft 14 through sleeve 25, gear 28, gear 18, short shaft 17, gear 19, gear 22, sleeve 20 and sprocket wheel 21.

From the foregoing it will be seen that I provide an extremely simple and efficient device.

Having thus fully described my invention I claim:

1. In a friction gearing, the combination with the engine shaft and the friction disk mounted thereon, of a pair of side frames, a transverse shaft mounted therein, a friction wheel secured upon said shaft, a sliding frame arranged in the rear of said friction disk, and levers for sliding said frame to force said disk into engagement with said friction wheel, substantially as described.

2. In a friction gearing, the combination with the engine shaft and the friction disk mounted thereon, of side frames provided with transverse openings therein, a transverse shaft mounted within said frames, a friction wheel secured upon said transverse shaft, a sliding arm mounted behind said friction disk in said transverse openings of said side frames, rollers carried by said arm and contacting with the rear face of said disk, and a lever mechanism for sliding said frame to force said disk into engagement with said friction wheel, substantially as described.

3. In a friction gearing, the combination with the engine shaft and the friction disk mounted thereon, of a pair of side frames, a transverse shaft mounted within said frames, a friction wheel keyed on said shaft to slide thereon across the face of said friction disk, a sliding frame arranged in the rear of said friction disk, and levers for sliding said frame to force said disk into engagement with said friction wheel, substantially as described.

4. In a friction gearing, the combination with the engine shaft and the friction disk mounted thereon, of side frames provided with openings therethrough, a transverse shaft mounted in said frames, a friction wheel keyed on said shaft to slide thereon across the face of said friction disk, a sliding arm mounted behind said friction disk within said openings in said side frames, rollers carried by said arm and contacting with the rear face of said disk, and a lever mechanism for sliding said frame to force said disk in engagement with said friction wheel, substantially as described.

5. In a friction gearing, the combination with the engine shaft and the friction disk mounted thereon, of side frames provided with openings therein, a transverse shaft mounted in said side frames, a friction wheel keyed on said shaft to slide thereon across the face of said disk, a sliding frame mounted in the rear of said friction disk, a lever mechanism for sliding said frame to force said disk into engagement with said friction wheel, a loosely mounted driving sleeve carried by said transverse shaft, a sleeve keyed on said shaft to slide thereon, said sleeves being formed with clutch faces upon their adjacent ends and means for sliding said last named sleeve, substantially as described.

6. In a friction gearing, the combination with the side frames, the friction disk and the engine shaft for driving said disk, of a transverse shaft mounted in said frames, a friction wheel keyed on said shaft to slide thereon, means for forcing said disk into engagement with said friction wheel, a loosely mounted sleeve carried by said transverse shaft, a sleeve keyed on said shaft to slide thereon, said sleeves being formed with clutch faces upon their adjacent ends, and means for sliding said last named sleeve, substantially as described.

In testimony whereof I affix my signature in presence of two witnesses.

EDWARD B. CRIBB.

Witnesses:
J. A. DOBBINS,
W. M. PHELPS.